US012709251B2

(12) United States Patent
Watanabe et al.

(10) Patent No.: US 12,709,251 B2
(45) Date of Patent: Aug. 18, 2026

(54) CONTROL DEVICE

(71) Applicant: ADVICS CO., LTD., Kariya (JP)

(72) Inventors: Shunya Watanabe, Kariya (JP); Yoshio Masuda, Kariya (JP)

(73) Assignee: ADVICS CO., LTD., Kariya-shi (JP)

( * ) Notice: Subject to any disclaimer, the term of this patent is extended or adjusted under 35 U.S.C. 154(b) by 383 days.

(21) Appl. No.: 18/264,103

(22) PCT Filed: Feb. 25, 2022

(86) PCT No.: PCT/JP2022/007977
§ 371 (c)(1),
(2) Date: Aug. 3, 2023

(87) PCT Pub. No.: WO2022/181780
PCT Pub. Date: Sep. 1, 2022

(65) Prior Publication Data
US 2024/0092321 A1 Mar. 21, 2024

(30) Foreign Application Priority Data
Feb. 26, 2021 (JP) ................................ 2021-031060

(51) Int. Cl.
*B60T 7/04* (2006.01)
*B60T 8/171* (2006.01)
*B60T 13/20* (2006.01)

(52) U.S. Cl.
CPC ............. *B60T 7/042* (2013.01); *B60T 8/171* (2013.01); *B60T 13/20* (2013.01)

(58) Field of Classification Search
CPC .......... B60T 7/042; B60T 8/171; B60T 13/20; B60T 8/3255; B60T 8/3265; B60T 13/74; B60T 2201/12
See application file for complete search history.

(56) References Cited

U.S. PATENT DOCUMENTS

2020/0262407 A1 8/2020 Yamamoto et al.

FOREIGN PATENT DOCUMENTS

JP 2019073164 A 5/2019

OTHER PUBLICATIONS

Japanese Patent No. JP 08127331 to Shimizu published on May 21, 1996.*

(Continued)

*Primary Examiner* — Pamela Rodriguez
(74) *Attorney, Agent, or Firm* — BUCHANAN INGERSOLL & ROONEY PC

(57) ABSTRACT

A control device is applied to a friction brake device of a vehicle. The friction brake device produces a friction brake force in the vehicle by starting driving of an electric motor. The control device includes a motor control unit configured to control the electric motor. The control device includes an acquisition unit configured to acquire an index value corresponding to a magnitude of a target value of the friction brake force. A value for determining a magnitude of the index value is set as a limit determination value. The motor control unit limits an increase speed of the number of rotations of the electric motor if the index value is equal to or less than the limit determination value, and releases the limit if the index value exceeds the limit determination value.

6 Claims, 4 Drawing Sheets

(56) References Cited

OTHER PUBLICATIONS

German Patent No. DE 10355239 to Magel et al published on Mar. 3, 2005.*
Japanese Patent No. JP 2011037404 to Miyazaki et al published on Feb. 24, 2011.*
WO document No. WO 2017175846 to Tanaka et al published on Oct. 12, 2017.*
International Search Report (PCT/ISA/210) with translation and Written Opinion (PCT/ISA/237) mailed on May 10, 2022, by the Japan Patent Office as the International Searching Authority for International Application No. PCT/JP2022/007977. (8 pages).

* cited by examiner

CONTROL DEVICE

TECHNICAL FIELD

The present disclosure relates to a control device for controlling a friction brake device of a vehicle.

BACKGROUND ART

PTL 1 describes a friction brake device that produces a friction brake force by adjusting a hydraulic pressure in a wheel cylinder. The friction brake device includes a pressurization mechanism that supplies a brake fluid into the wheel cylinder. The pressurization mechanism has a function of driving a pump using an electric motor as a power source to increase the hydraulic pressure in the wheel cylinder.

With respect to such a pressurization mechanism, it is known that an accumulator is omitted. The pressurization mechanism in this case does not have a function of storing a high-pressure brake fluid. Therefore, when the friction brake force is requested to be produced, the electric motor is started to be driven from that time to produce the friction brake force in a vehicle.

CITATION LIST

Patent Literature

PTL 1: JP2019-73164A

SUMMARY

Technical Problem

In order to ensure responsiveness when a friction brake force is required to be produced in a friction brake device having no accumulator, the number of rotations of an electric motor is increased. As the number of rotations of the electric motor increases, a sound produced by driving the electric motor increases. Therefore, when the friction brake force is produced, the sound produced by driving the electric motor provided in the friction brake device may be transmitted to a driver in a vehicle. The driver may feel uncomfortable due to the sound produced by driving the electric motor.

Solution to Problem

A control device for solving the above problem is a control device to be applied to a friction brake device including an electric motor and configured to produce a friction brake force in a vehicle by starting driving of the electric motor, the control device including a motor control unit configured to control the electric motor, and an acquisition unit configured to acquire an index value corresponding to a magnitude of a target value of the friction brake force, in which a value for determining a magnitude of the index value is set as a limit determination value, and the motor control unit limits an increase speed of the number of rotations of the electric motor if the index value is equal to or less than the limit determination value, and releases the limit if the index value exceeds the limit determination value.

According to the above configuration, it is possible to prevent the number of rotations of the electric motor from being increased during a period from when the vehicle is started to be braked until the index value exceeds the limit determination value. Accordingly, it is possible to prevent a sound produced by driving the electric motor from being increased, and a driver is less likely to feel uncomfortable.

DESCRIPTION OF EMBODIMENTS

Hereinafter, a control device according to an embodiment will be described with reference to FIGS. 1 to 4.

Figure 1:
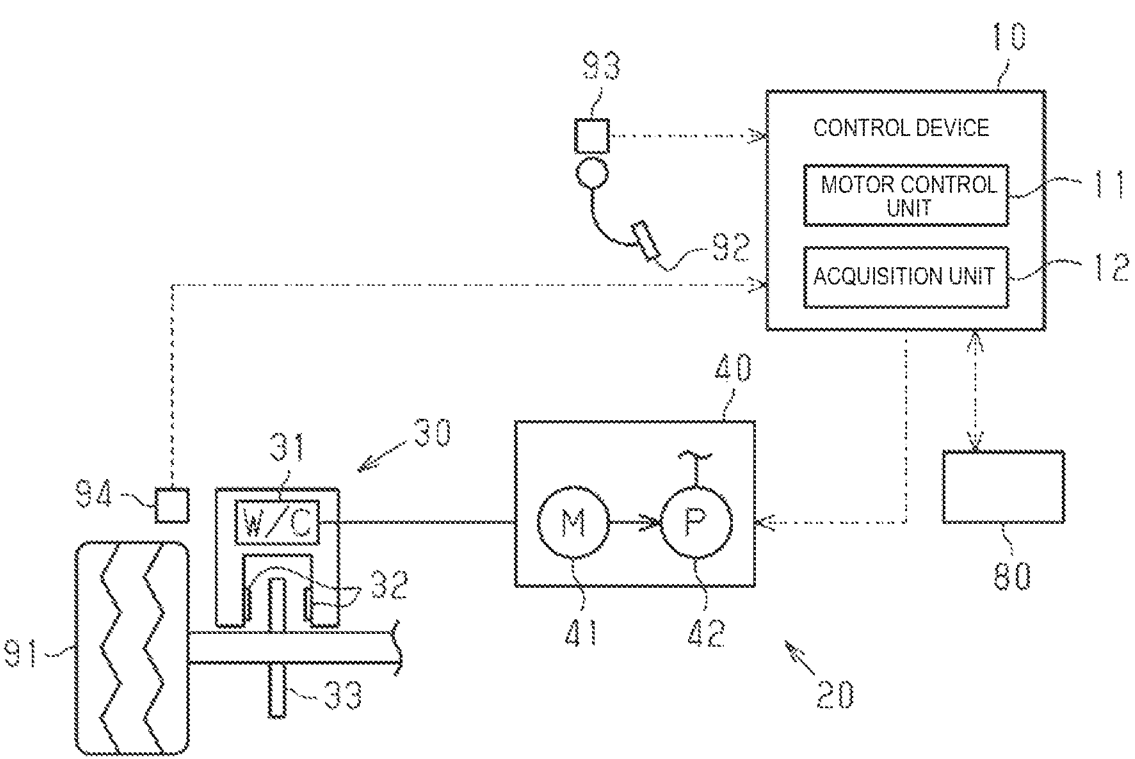
FIG. 1 is a schematic diagram showing a control device according to an embodiment and a friction brake device to be controlled by the control device.

FIG. 1 shows a vehicle including a control device 10 and a friction brake device 20. The control device 10 controls the friction brake device 20. The friction brake device 20 can produce a friction brake force in the vehicle. The vehicle equipped with the friction brake device 20 includes a brake operation member 92. The brake operation member 92 can be operated by a driver in the vehicle. An example of the brake operation member 92 includes a brake pedal. The vehicle may include an automatic driving control unit 80 that calculates a command value for automatically driving the vehicle. The automatic driving control unit 80 can transmit and receive information to and from the control device 10.

<Friction Brake Device>

The friction brake device 20 will be described. The friction brake device 20 includes a brake mechanism 30 corresponding to each wheel 91 of the vehicle. FIG. 1 shows one wheel 91 of the wheels 91 provided on the vehicle and the brake mechanism 30 corresponding to the wheel 91. The other wheels 91 and brake mechanisms 30 are not shown.

An example of the friction brake device 20 includes a hydraulic brake device. In the hydraulic brake device, a friction brake force can be produced according to a WC pressure, which is a hydraulic pressure in a wheel cylinder 31 provided in the brake mechanism 30. The brake mechanism 30 is configured such that the higher the WC pressure, the larger a force for pressing a friction material 32 against a rotation body 33 that rotates integrally with the wheel 91. Each brake mechanism 30 can apply a larger brake force to the wheel 91 as the WC pressure increases.

The friction brake device 20 can supply a brake fluid into each wheel cylinder 31. Although not shown, the friction brake device 20 includes a master cylinder that supplies the brake fluid into the wheel cylinder 31 according to an operation of the brake operation member 92. The friction brake device 20 includes a pressurization mechanism 40 for pressurizing the brake fluid, and the pressurization mechanism 40 includes an electric motor 41 and a pump 42. The pump 42 is an electric pump using the electric motor 41 as a power source. The brake fluid discharged from the pump 42 is supplied to each wheel cylinder 31. The pump 42 is a pressurization source that increases the WC pressure. As a driving amount of the electric motor 41, which is the power source of the pump 42, is larger, the WC pressure can be increased.

The friction brake device 20, which is the hydraulic brake device, can produce the friction brake force by transmitting the driving amount of the electric motor 41 to the brake mechanism 30 via the brake fluid. As an example, the friction brake device 20 does not include an accumulator for storing a high-pressure brake fluid. When the friction brake force is requested to be produced, the friction brake force is produced in the vehicle by starting driving of the electric motor 41. The WC pressure is increased after the driving of the electric motor 41 is started and the brake fluid is pressurized.

<Sensor and the Like Provided in Vehicle>

The vehicle includes various sensors. FIG. 1 shows a brake sensor 93 and a wheel speed sensor 94 as an example of various sensors. A detection signal from various sensors is input to the control device 10.

The brake sensor 93 can detect an operation amount of the brake operation member 92. An example of the operation amount of the brake operation member 92 is a pedal stroke as a movement amount of the brake operation member 92. In addition, an example of the operation amount of the brake operation member 92 includes a pedal effort serving as a pressure applied to the brake operation member 92 in order to operate the brake operation member 92.

The wheel speed sensor 94 can detect a wheel speed of the wheel 91. The wheel speed sensor 94 is provided for each wheel 91. A vehicle speed can be calculated based on the wheel speed.

The vehicle may include a measuring instrument for measuring noise. The measuring instrument may be attached to an inside of the vehicle, or may be attached to an outside of the vehicle. The vehicle may include a microphone attached to the inside of the vehicle. Information on a sound acquired by the measuring instrument or the microphone can be input to the control device 10.

<Control Device>

The control device 10 will be described. The control device 10 includes a plurality of functional units that execute various controls. FIG. 1 shows a motor control unit 11 and an acquisition unit 12 as an example of the functional unit.

The control device 10 may have any one of the following configurations (a) to (c). (a) One or more processors that execute various types of processing according to a computer program are provided. The processor includes a CPU and a memory such as an RAM and an ROM. The memory stores a program code or a command configured to cause the CPU to execute processing. The memory, that is, a computer-readable medium includes any available medium that can be accessed by a general or dedicated computer. (b) One or more dedicated hardware circuits that execute various types of processing are provided. The dedicated hardware circuit is, for example, an application specific integrated circuit (ASIC), or a field programmable gate array (FPGA). (c) A processor that executes a part of various types of processing according to a computer program, and a dedicated hardware circuit that executes the remaining processing of the various types of processing are provided.

The acquisition unit 12 can calculate a state quantity of the vehicle based on the detection signal from various sensors. For example, the acquisition unit 12 can calculate the operation amount of the brake operation member 92 based on a detection signal from the brake sensor 93. That is, the acquisition unit 12 can calculate the pedal stroke, the pedal effort, and the like. In addition, the acquisition unit 12 can calculate the vehicle speed that is a traveling speed of the vehicle based on a detection signal from the wheel speed sensor 94.

The acquisition unit 12 can acquire a background noise level BN obtained by estimating a magnitude of background noise. The background noise here refers to noise other than a sound originating from the driving of the electric motor 41 among noises transmitted to the driver in the vehicle. The background noise may also be referred to as background noise for the sound originating from the driving of the electric motor 41.

The background noise level BN will be described. The background noise level BN is a value that increases as the background noise is estimated to be large. It can be said that when the background noise level BN is high, the background noise for the sound derived from the driving of the electric motor 41 is large, and the sound derived from the driving of the electric motor 41 is hardly transmitted to the driver. On the other hand, it can be said that when the background noise level BN is low, the background noise for the sound derived from the driving of the electric motor 41 is small, and the sound derived from the driving of the electric motor 41 is easily transmitted to the driver.

For example, the background noise is larger when the vehicle is traveling than when the vehicle is stopped. When the vehicle speed that is the traveling speed of the vehicle increases, the background noise is larger. Therefore, as an example, the acquisition unit 12 can calculate the background noise level BN to be higher as the vehicle speed of the vehicle increases. When a power source of the vehicle is an engine, the background noise level BN may be calculated to be higher as the number of rotations of the engine increases. The acquisition unit 12 may calculate the background noise level BN to be higher as road noise increases. For example, when a friction coefficient of a road surface on which the vehicle travels is large, it can be estimated that the road noise is larger. Therefore, as an example, the acquisition unit 12 can calculate the background noise level BN to be higher as the friction coefficient of the road surface increases.

For example, when an air conditioner of the vehicle is in operation, the background noise increases. The acquisition unit 12 may calculate the background noise level BN to be higher when the air conditioner is in operation than when the air conditioner is not in operation.

For example, when a sound is output from an in-vehicle acoustic device, the background noise increases. The acquisition unit 12 may calculate the background noise level BN to be higher when the sound is output from the acoustic device than when no sound is output from the acoustic device.

In addition, the acquisition unit 12 may calculate the background noise level BN based on a sound pressure of the noise. For example, the acquisition unit 12 may calculate the background noise level BN using the sound pressure acquired from the measuring instrument or the microphone. Even when the sound pressure of the background noise is the same, it is more difficult for the driver to determine an operation sound when a difference between a frequency of the operation sound and a frequency of the background noise is small than when the difference between the frequency of the operation sound and the frequency of the background noise is large. Therefore, in particular, the background noise level BN can be calculated based on a sound pressure of the same frequency as a frequency of the sound originating from the driving of the electric motor 41 among the detected noise. The background noise level BN may be calculated based on a sound pressure of a predetermined frequency close to the frequency of the sound originating from the driving of the electric motor 41.

The acquisition unit 12 can acquire a target pressure PT as a target value of a pressure for pressing the friction material 32 against the rotation body 33 in the brake mechanism 30. For example, the acquisition unit 12 can calculate the target pressure PT based on the pedal stroke. The target pressure PT is an example of an index value corresponding to a magnitude of the target value of the friction brake force.

Another example of the index value includes a target brake force severing as the target value of the friction brake force. In addition, an example of the index value includes a target deceleration of the vehicle, an actual brake force actually produced on the vehicle, an actual deceleration actually occurring in the vehicle, and the WC pressure related to a pressure of the brake fluid or a servo pressure indicating a pressure produced by the pump 42. When the vehicle is not automatically driven, that is, when the vehicle travels according to an operation of the driver, the operation amount such as the pedal stroke and the pedal effort may be used as the index value.

The motor control unit 11 can control the electric motor 41. The motor control unit 11 controls the electric motor 41 by adjusting a motor rotation number Nm, which is the number of rotations of the electric motor 41. The motor control unit 11 drives the electric motor 41 such that the motor rotation number Nm follows a target rotation number NT, which is a target value of the motor rotation number Nm. The target rotation number NT is the number of rotations of the electric motor 41 required for pressurizing the brake fluid to a pressure for producing the friction brake force.

The motor control unit 11 may execute limit processing of limiting the motor rotation number Nm to a value smaller than the target rotation number NT. The limit processing is processing of preventing a sound produced by driving the electric motor 41 from being increased when the friction brake force is started to be produced. Details of the limit processing will be described later.

<Processing Executed by Control Device>

Figure 2:
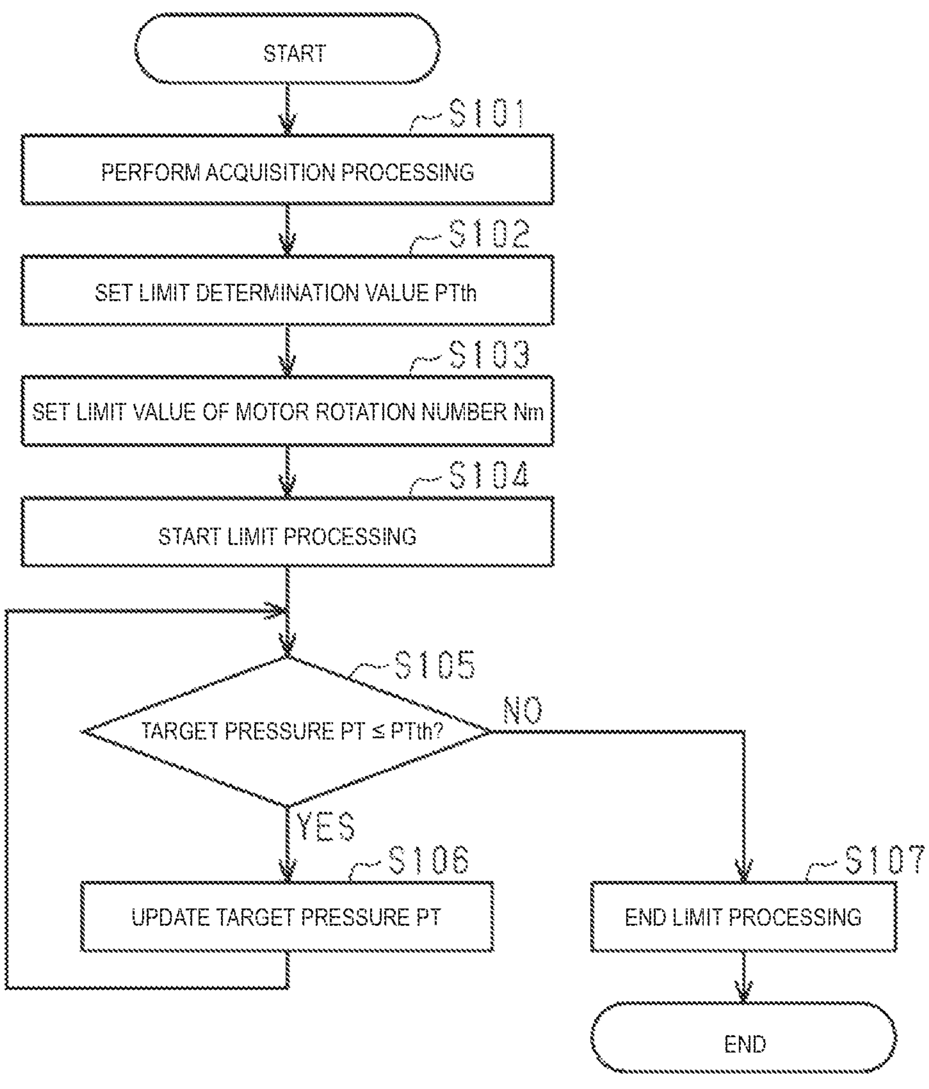
FIG. 2 is a flowchart showing a flow of processing to be executed by the control device.

FIG. 2 shows a flow of processing executed by the control device 10. The present processing routine is started when the friction brake force is required to be produced. For example, the present processing routine is started when the brake operation member 92 is started to be operated. When the vehicle is automatically driven, the present processing routine can be started when brake is requested by the automatic driving control unit 80.

When the present processing routine is started, first, in step S101, the control device 10 causes the acquisition unit 12 to perform acquisition processing. In the acquisition processing, the acquisition unit 12 acquires the target pressure PT and the background noise level BN. Thereafter, the control device 10 causes the processing to proceed to step S102.

In step S102, the control device 10 causes the motor control unit 11 to set a limit determination value PTth. The limit determination value PTth is a value for determining the magnitude of the target pressure PT, which is an index value.

The setting of the limit determination value PTth will be described. The motor control unit 11 can calculate the limit determination value PTth based on the background noise level BN, for example. In this case, the motor control unit 11 calculates the limit determination value PTth to be smaller as the background noise level BN increases. The motor control unit 11 may calculate the limit determination value PTth based on a temperature of the brake fluid. In this case, the motor control unit 11 calculates the limit determination value PTth to be smaller as the temperature of the brake fluid decreases. The motor control unit 11 may calculate the limit determination value PTth based on a temperature of the friction material 32. In this case, the motor control unit 11 calculates the limit determination value PTth to be smaller as the temperature of the friction material 32 decreases. The temperature of the brake fluid and the temperature of the friction material 32 can be values detected by a temperature sensor, for example. The temperature of the brake fluid and the temperature of the friction material 32 can also be calculated based on a time during which the friction brake device 20 is operated.

In the processing of step S102, when the limit determination value PTth is set, the control device 10 causes the processing to proceed to step S103.

In step S103, the control device 10 causes the motor control unit 11 to set a limit value of the motor rotation number Nm. Here, the motor control unit 11 sets a gradient limit value for limiting an increase speed of the motor rotation number Nm. The gradient limit value is a value corresponding to an inclination at which the motor rotation number Nm increases. When the gradient limit value is set reduced to limit the increase speed of the motor rotation number Nm, a period until the motor rotation number Nm increases is increased.

The setting of the gradient limit value will be described. The motor control unit 11 can calculate the gradient limit value based on the background noise level BN, for example. In this case, the gradient limit value is calculated to be larger as the background noise level BN increases. That is, as the background noise level BN increases, the limit for the increase speed is eased. The motor control unit 11 may calculate the gradient limit value based on the temperature of the brake fluid. In this case, the motor control unit 11 calculates the gradient limit value to be larger as the temperature of the brake fluid decreases. The motor control unit 11 may calculate the gradient limit value based on the temperature of the friction material 32. In this case, the motor control unit 11 calculates the gradient limit value to be larger as the temperature of the friction material 32 decreases. The gradient limit value can also be calculated as a value that can prevent the pressure of the brake fluid from instantaneously increasing as the motor rotation number Nm increases when the driving of the electric motor 41 is started.

In the processing of step S103, when the limit value of the motor rotation number Nm is set, the control device 10 causes the processing to proceed to step S104.

In the processing of step S104, the control device 10 causes the motor control unit 11 to start the limit processing. As a result, the electric motor 41 is driven in a state in which the motor rotation number Nm is limited based on the limit value set in step S103. When the control device 10 causes the motor control unit 11 to start the limit processing, the processing proceeds to step S105.

In step S105, the control device 10 causes the motor control unit 11 to determine whether the target pressure PT is equal to or less than the limit determination value PTth. If the target pressure PT is larger than the limit determination value PTth (S105: NO), the control device 10 causes the processing to proceed to step S107. In step S107, the control device 10 causes the motor control unit 11 to end the limit processing. As a result, the limit for the motor rotation number Nm is released. That is, the electric motor 41 is driven such that the motor rotation number Nm follows the target rotation number NT. When the control device 10 causes the motor control unit 11 to end the limit processing, the present processing routine ends.

On the other hand, in the processing of step S105, if the target pressure PT is equal to or less than the limit determination value PTth (S105: YES), the control device 10 causes the processing to proceed to step S106. In step S106, the control device 10 causes the acquisition unit 12 to update the target pressure PT. The acquisition unit 12 calculates the target pressure PT at a time of executing the processing of step S106 and updates the target pressure PT. Thereafter, the control device 10 causes the processing to proceed to step S105 again. That is, according to the processing of steps S105 and S106, the limit for the motor rotation number Nm is continued until the target pressure PT exceeds the limit determination value PTth. In other words, when the target pressure PT exceeds the limit determination value PTth, the limit for the motor rotation number Nm is released.

<Functions and Effects>

Functions and effects according to the present embodiment will be described.

Figure 3:
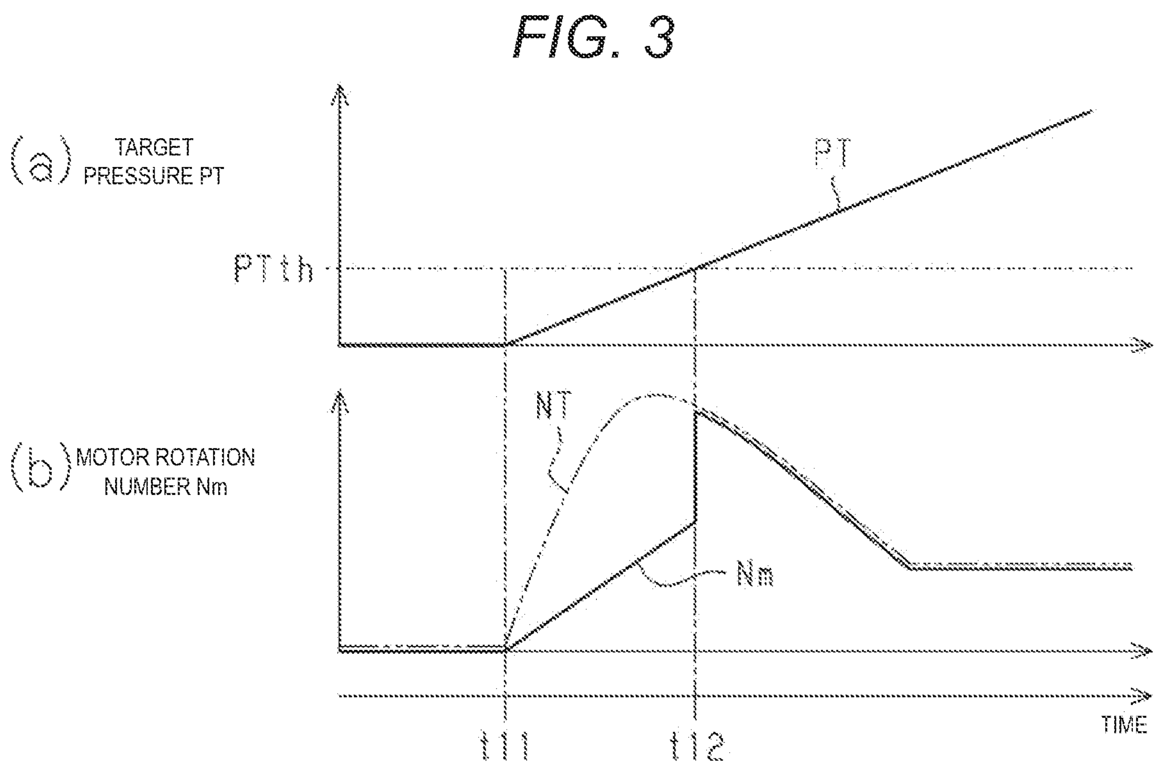
FIG. 3 is a timing chart showing a motor rotation number limited by the control device.

FIG. 3 shows transition of the motor rotation number Nm when the brake of the vehicle is started. In an example shown in FIG. 3, the friction brake force is requested to be produced from a timing t11.

As shown in (a) of FIG. 3, the target pressure PT starts increasing from the timing t11 at which the friction brake force is requested to be produced. According to the control device 10, the limit determination value PTth is set by requesting to produce the friction brake force (S102). Then, the gradient limit value that increases as the background noise level BN increases is set (S103), and the limit for the motor rotation number Nm is started (S104). The increase speed of the motor rotation number Nm is limited, whereby the motor rotation number Nm is kept lower than the target rotation number NT as shown in (b) of FIG. 3.

In the example shown in FIG. 3, the target pressure PT is increased at a constant speed after the timing t11. The target pressure PT does not exceed the limit determination value PTth before a timing t12. Therefore, during a period from the timing t11 to the timing t12, the limit for the motor rotation number Nm is continued (S105 and S106).

When the target pressure PT exceeds the limit determination value PTth at the timing t12, the limit for the motor rotation number Nm is released (S107). Therefore, after the timing t12, the motor rotation number Nm is controlled based on the target rotation number NT. In the example shown in FIG. 3, the period from the timing t11 to the timing t12 is a period during which the increase speed of the motor rotation number Nm is limited.

According to the control device 10, it is possible to prevent the motor rotation number Nm from increasing during a period from when the brake of the vehicle is started until the target pressure PT exceeds the limit determination value PTth. Accordingly, it is possible to prevent the sound produced by driving the electric motor 41 from being increased during the period, and the driver is less likely to feel uncomfortable.

Incidentally, it is considered that when the background noise is large even when driving sound of the electric motor 41 is large, the driver is difficult to determine that the noise is derived from the electric motor 41. That is, when the background noise is large, even when the driving sound of the electric motor 41 is large, the driver is less likely to feel uncomfortable.

In the control device 10, the limit determination value PTth is calculated to be smaller as the background noise level BN increases. Therefore, as the background noise level BN increases, the period until the target pressure PT exceeds the limit determination value PTth is easily shortened. That is, the period during which the increase speed of the motor rotation number Nm is limited is easily shortened. Therefore, when the background noise level BN is high and the driving sound of the electric motor 41 is allowed, the period during which the increase speed of the motor rotation number Nm is limited can be shortened to ensure the responsiveness. Accordingly, it is possible to shorten the period, during which the increase speed of the motor rotation number Nm is limited, to ensure the responsiveness while preventing the motor rotation number Nm from increasing in an early stage of the brake.

According to the control device 10, the increase speed of the motor rotation number Nm while the target pressure PT is equal to or less than the limit determination value PTth is limited by the gradient limit value that increases as the background noise level BN increases. Accordingly, when it is estimated that the background noise is large, the limit for the increase speed of the motor rotation number Nm can be eased. Therefore, when it is estimated that the background noise is large, the motor rotation number Nm can be increased earlier than when it is estimated that the background noise is small. Accordingly, it is possible to ensure a discharge pressure of the pump 42 using the electric motor 41 as the power source, and to ensure the responsiveness for adding the pressure of the brake fluid. That is, it is possible to ensure the responsiveness for producing the friction brake force.

In the friction brake device 20, when the temperature of the brake fluid or the temperature of the friction material 32 is low, the responsiveness for producing the friction brake force is easily decreased. Therefore, it may not be preferable to limit the increase speed of the motor rotation number Nm. In the control device 10, the limit determination value PTth can be calculated to be smaller as the temperature of the brake fluid and the temperature of the friction material 32 decrease. Accordingly, it is possible to shorten the period during which the increase speed of the motor rotation number Nm is limited to ensure the responsiveness. In the control device 10, the gradient limit value can be increased to ease the limit for the increase speed of the motor rotational speed Nm as the temperature of the brake fluid or the temperature of the friction material 32 decreases. Accordingly, the responsiveness can be ensured by reducing the decrease in responsiveness due to the limit for the motor rotation number Nm.

Figure 4:
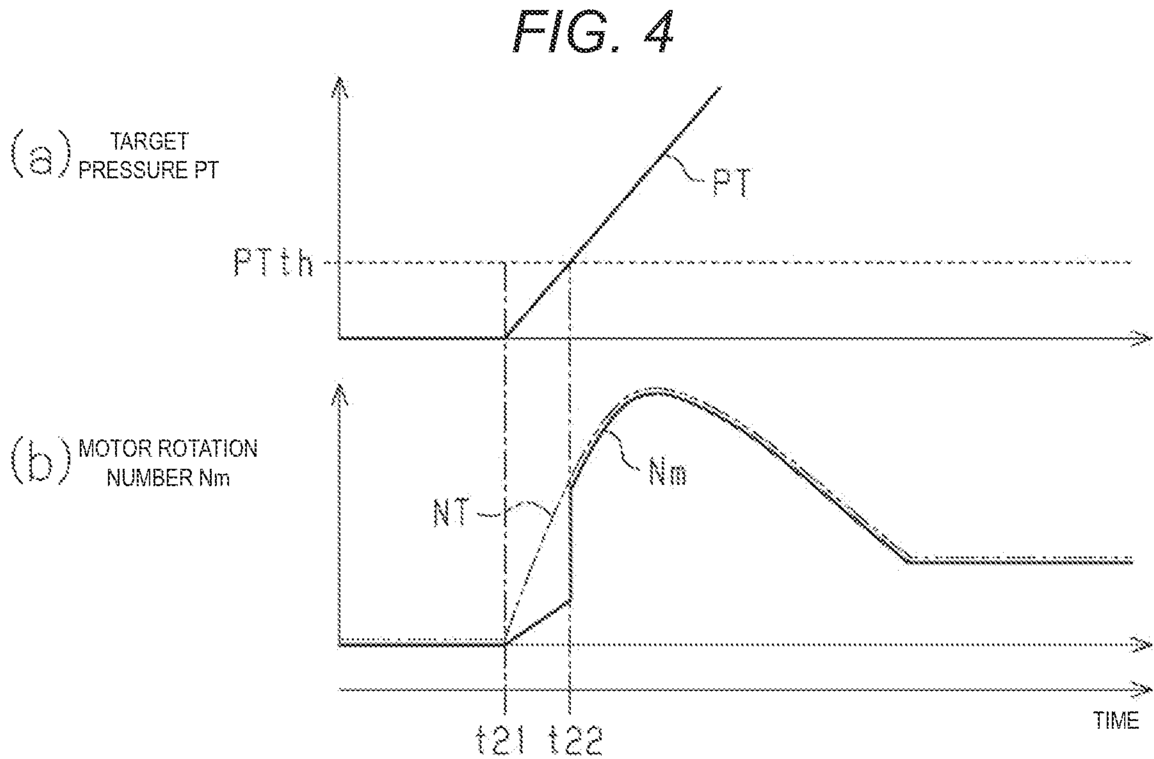
FIG. 4 is a timing chart showing the motor rotation number limited by the control device.

FIG. 4 shows an example in which the increase speed of the target pressure PT is high as compared with the example shown in FIG. 3. In the example shown in FIG. 4, the friction brake force is requested to be produced from a timing t21. As shown in (a) of FIG. 4, the increase speed of the target pressure PT is high, whereby the period until the target pressure PT exceeds the limit determination value PTth is shortened. That is, the period during which the increase speed of the motor rotation number Nm is limited is shortened. When the target pressure PT exceeds the limit determination value PTth at the timing t22, the limit for the motor rotation number Nm is released. Thereafter, as shown in (b) of FIG. 4, the motor rotation number Nm increases as the target rotation number NT increases. In this way, according to the control device 10, when the increase speed of the target pressure PT is high, the period during which the increase speed of the motor rotation number Nm is limited can be shortened, and the motor rotation number Nm can be increased early. Accordingly, it is possible to drive the pump 42 at the large motor rotation number Nm and to ensure the responsiveness while ensuring a period of preventing the sound produced by driving the electric motor 41 from being increased. Therefore, even when sudden brake is requested, a friction brake force according to the request can be produced.

As compared with the example shown in FIG. 3, when the increase speed of the target pressure PT is low, the period until the target pressure PT exceeds the limit determination value PTth is long. That is, the period during which the increase speed of the motor rotation number Nm is limited is lengthened. Therefore, when the increase speed of the target pressure PT is low, it is possible to further prevent the sound produced by driving the electric motor 41 from being increased.

FIGS. 3 and 4 show an example in which the increase speed of the target pressure PT is constant after the brake is started. Here, for example, a case is considered in which the operation amount of the brake operation member 92 is increased during the brake to increase the increase speed of the target pressure PT. In this case, as compared with a case in which the target pressure PT is constant, the target pressure PT exceeds the limit determination value PTth at an earlier timing. Therefore, when the increase speed of the target pressure PT increases, the limit for the increase speed of the motor rotation number Nm is released quickly. In this way, according to the control device 10, the responsiveness according to the target pressure PT can be ensured. On the other hand, when the increase speed of the target pressure PT is low during the brake, the period until the target pressure PT exceeds the limit determination value PTth is long as compared with the case in which the target pressure PT is constant. Therefore, when the increase speed of the target pressure PT is reduced, it is possible to further prevent the driver from feeling uncomfortable by the sound derived from the electric motor 41.

When the target pressure PT based on the operation of the driver is set, a change rate of the target pressure PT during the operation may not be constant and may vary. For example, a value of the change rate may change like noise. Therefore, if the motor rotation number Nm is controlled by identifying sudden brake and slow brake based on the change rate of the target pressure PT, the increase speed of the motor rotation number Nm may be different from an assumption due to an influence of the variation in the change rate of the target pressure PT. On the other hand, in the control device 10, the increase speed of the motor rotation number Nm is limited based on a fact that the target pressure PT is equal to or less than the limit determination value PTth. Therefore, it is possible to control the increase speed of the motor rotation number Nm in response to the sudden brake or the slow brake without being influenced by the variation in the change rate of the target pressure PT.

As an example of the friction brake device 20, the brake operation member 92 is joined to the master cylinder, and the pressurization mechanism 40 is integrated with the master cylinder or the like. In such a case, the pressurization mechanism 40 is inevitably positioned in the vicinity of the front of the driver who operates the brake operation member 92. The pressurization mechanism 40 is firmly connected to a vehicle body of the vehicle. Therefore, the sound and vibration produced by driving the electric motor 41 are more easily transmitted to the driver. When the friction brake device 20 is configured as described above, the control device 10 according to the present embodiment capable of preventing an uncomfortable feeling due to the sound derived from the electric motor 41 is more effective.

(Modification)

The present embodiment can be modified and implemented as follows. The present embodiment and the following modification can be implemented in combination with each other within a technically consistent range.

In the above embodiment, the increase speed of the motor rotation number Nm is limited by the limit processing. In addition, an upper limit value can be set to the motor rotation number Nm.

Description will be made with reference to FIG. 5. In an example shown in FIG. 5, as shown in (a) of FIG. 5, the friction brake force is requested to be produced from a timing t31. At a timing t33, the target pressure PT exceeds the limit determination value PTth.

Figure 5:
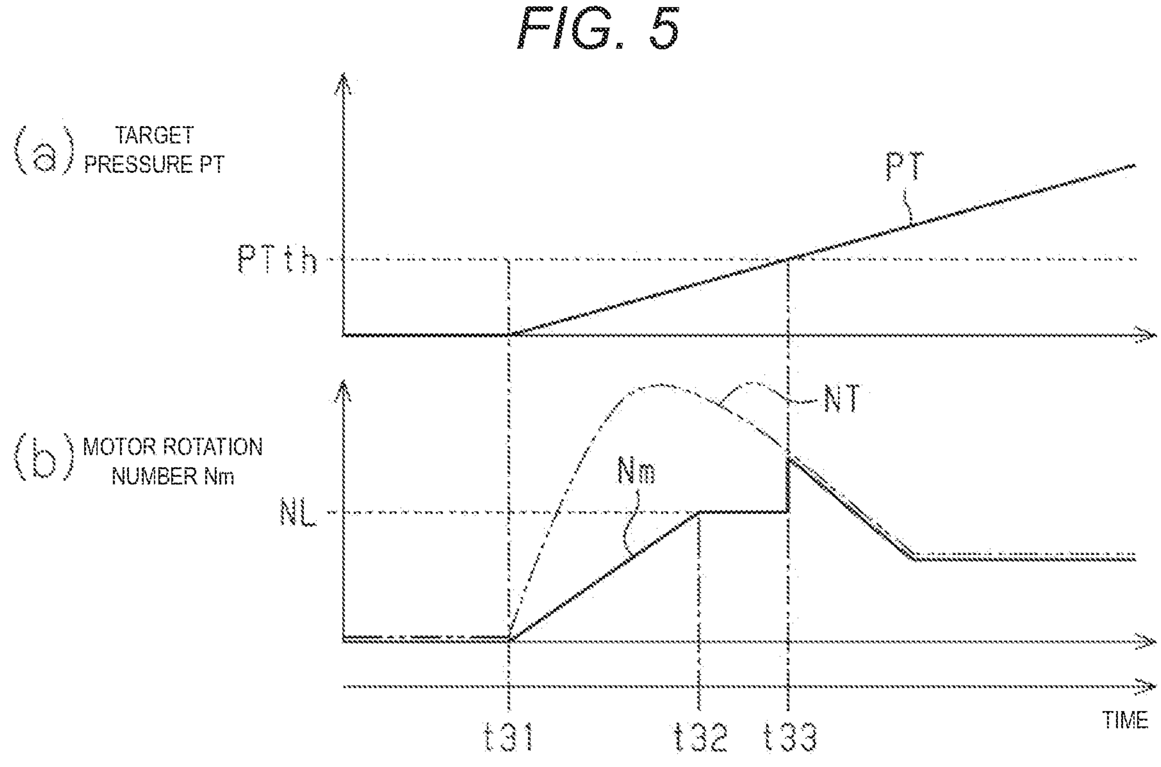
FIG. 5 is a timing chart showing the motor rotation number limited by a control device according to a modification.

As shown in (b) of FIG. 5, an upper limit motor rotation number NL is set as the upper limit value of the motor rotation number Nm. During the period until the target pressure PT exceeds the limit determination value PTth, the motor control unit 11 can limit the motor rotation number Nm to equal to or less than a smaller one of the upper limit motor rotation number NL and the target rotation number NT. Therefore, at a timing t32 before the timing t33, when the motor rotation number Nm reaches the upper limit motor rotation number NL, the motor rotation number Nm is maintained constant. Thereafter, when the target pressure PT exceeds the limit determination value PTth at the timing t33, the limit for the motor rotation number Nm is released, and the electric motor 41 is driven such that the motor rotation number Nm follows the target rotation number NT.

In this case, the motor control unit 11 may set the upper limit motor rotation number NL in addition to the gradient limit value in the processing of step S103 in FIG. 2. For example, the upper limit motor rotation number NL may be a value previously calculated by an experiment or the like. The upper limit motor rotation number NL may be calculated as a larger value as the background noise level BN increases. The upper limit motor rotation number NL may be a value that is variable during brake. For example, the upper limit motor rotation number NL may be calculated by multiplying the target rotation number NT by a value larger than "0" and smaller than "1".

In the above embodiment, the value calculated in the processing of step S102 in FIG. 2 is used as the limit determination value PTth. Instead, the limit determination value PTth may be a constant value that is previously calculated by the experiment or the like and stored in the motor control unit 11. In this case, the processing of step S102 in FIG. 2 may be omitted.

In the above embodiment, the control device 10 that controls the friction brake device 20 serving as the hydraulic brake device is exemplified. The friction brake device is not limited to the hydraulic brake device. The control device may control a mechanical friction brake device that produces a friction brake force by mechanically transmitting a driving amount of an electric motor.

Figure 6:
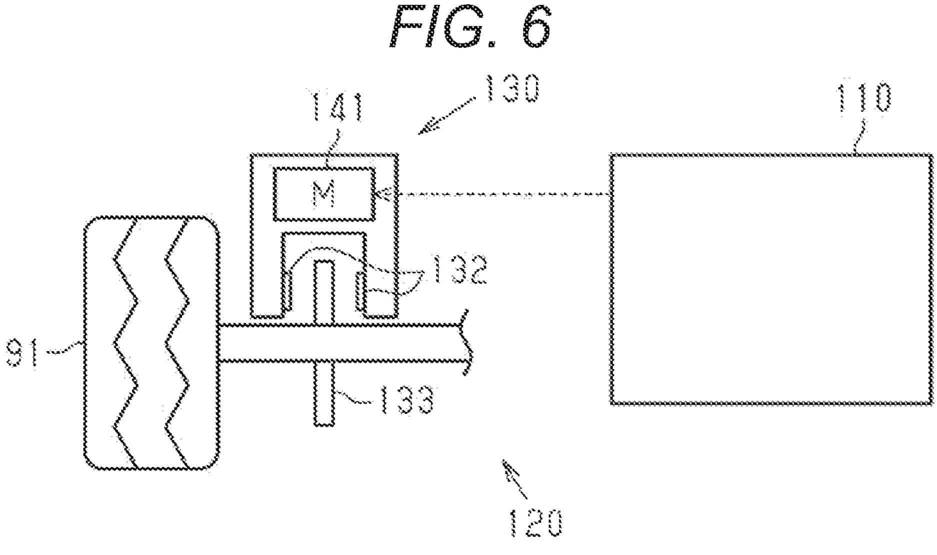
FIG. 6 is a schematic diagram showing a control device according to another modification and a friction brake device to be controlled by the control device.

FIG. 6 shows a control device 110 and a friction brake device 120 controlled by the control device 110. The friction brake device 120 includes a brake mechanism 130. The brake mechanism 130 includes an electric motor 141. The brake mechanism 130 includes, for example, a reduction gear. The brake mechanism 130 includes, for example, a linear motion converting mechanism. The brake mechanism 130 can press a friction material 132 against a rotation body 133 according to a driving amount of the electric motor 141 transmitted by the reduction gear, the linear motion converting mechanism, and the like. The control device 110 controls the friction brake device 120 and has a function of executing limit processing of limiting an increase speed of the number of rotations of the electric motor 141.

Similarly to the control device 10 according to the above embodiment, the control device 110 can limit the increase speed of the number of rotations of the electric motor 141 in an early stage of the brake. More specifically, the control device 110 can prevent the number of rotations of the electric motor 141 from increasing during a period from when brake of a vehicle is started until an index value exceeds a limit determination value. Accordingly, it is possible to prevent the sound produced by driving the electric motor 141 from being increased during the period, and the driver is less likely to feel uncomfortable.

A gradient limit value to be set in this case can be calculated as a value for which a collision between gears associated with an increase in the number of rotations can be reduced when driving of the electric motor 141 is started.

The invention claimed is:

1. A control device to be applied to a friction brake device including an electric motor and configured to produce a friction brake force in a vehicle when the electric motor is first driven, the control device comprising:

a motor control unit configured to control the electric motor; and an acquisition unit configured to acquire an index value corresponding to a magnitude of a target value of the friction brake force, wherein a value for determining a magnitude of the index value is set as a limit determination value, the motor control unit limits an increase speed of the number of rotations of the electric motor if the index value is equal to or less than the limit determination value, and releases the limit if the index value exceeds the limit determination value, the acquisition unit acquires a background noise level obtained by estimating a magnitude of a background noise for a sound derived from driving of the electric motor, and the motor control unit sets the limit determination value to be smaller as the background noise level increases.

2. The control device according to claim 1, wherein when the index value is equal to or less than the limit determination value, the motor control unit limits the increase speed to be smaller as the background noise level decreases.

3. The control device according to claim 2, wherein the acquisition unit obtains the background noise level to be higher as a vehicle speed of the vehicle increases.

4. The control device according to claim 1, wherein the acquisition unit obtains the background noise level to be higher as a vehicle speed of the vehicle increases.

5. A control device to be applied to a friction brake device including an electric motor and configured to produce a friction brake force in a vehicle when the electric motor is first driven, the control device comprising:

a motor control unit configured to control the electric motor; and an acquisition unit configured to acquire an index value corresponding to a magnitude of a target value of the friction brake force, wherein a value for determining a magnitude of the index value is set as a limit determination value, the motor control unit limits an increase speed of the number of rotations of the electric motor if the index value is equal to or less than the limit determination value, and releases the limit if the index value exceeds the limit determination value, the acquisition unit acquires a background noise level obtained by estimating a magnitude of a background noise for a sound derived from driving of the electric motor, and when the index value is equal to or less than the limit determination value, the motor control unit limits the increase speed to be smaller as the background noise level decreases.

6. The control device according to claim 5, wherein the acquisition unit obtains the background noise level to be higher as a vehicle speed of the vehicle increases.

* * * * *